Dec. 18, 1951 P. S. MORGAN 2,579,085
VARIABLE SPEED POWER TRANSMISSION
Filed Jan. 28, 1949 5 Sheets-Sheet 1

INVENTOR.
Porter S. Morgan,
BY

Patented Dec. 18, 1951

2,579,085

UNITED STATES PATENT OFFICE 2,579,085

VARIABLE-SPEED POWER TRANSMISSION

Porter S. Morgan, Westport, Conn., assignor to The Connecticut Variable Gear Corporation, New Haven, Conn., a corporation of Connecticut Application January 28, 1949, Serial No. 73,363

6 Claims. (Cl. 74—679)

This invention relates to mechanism for the transmission of power from a driving to a driven shaft, and it has particular reference to the provision of a mechanical power transmission in which the speed ratio between the input and output shafts may be varied in small increments throughout a wide range.

Conventional power transmissions of the gear type provide for several speed and torque ratios between the driving and driven shafts, by manual or automatic selection of one of a few possible couplings in the gear train. While the power losses through the gearing are relatively low, such mechanisms operate under the disadvantage of being limited in the number of speed ratios which they can establish. It has been proposed to provide hydraulic couplings or power transmissions, in which, within limits, a greater number of ratios may be provided, but these devices have high internal power losses, and accordingly are unsatisfactory.

According to the present invention, there is provided a mechanical power transmission, in which the torque is transmitted from the driving shaft to the driven member through rotatable and successively operating ratchet members, thereby establishing a continuous positive drive with low power loss. Additionally, provision is made to vary the throw of the ratchets, or the angular distance through which they act, while the transmission is in operation, and to any degree which may be desired, thus making it possible to obtain any speed ratio. The ratio may be manually selected, or it may be governed automatically, thereby making the transmission torque or load responsive.

The principles of the invention, and a practical mechanism embodying the same, will be explained in the following portions of this specification, with reference to the accompanying drawings, wherein.

Figures 1, 2, 3:
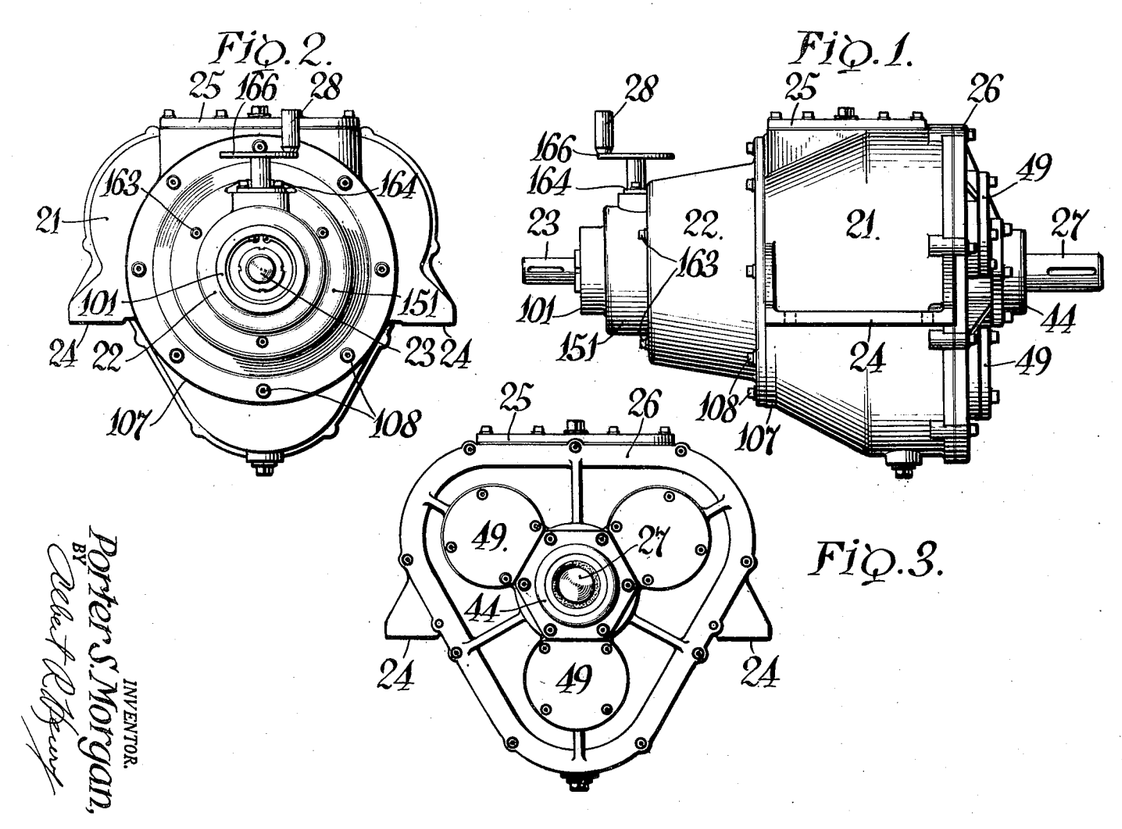
Fig. 1 is a side elevation of the transmission assembly.
Figs. 2 and 3 are elevations respectively taken from the input and output ends.

As viewed in Figs. 1, 2, and 3, the transmission includes a two part casing including a generally triangular section 21 to which is bolted a conical section 22. A power input or driving shaft 23 projects from the section 22, and it may be coupled in any desired manner to a prime mover, such as an internal combustion engine or an electric motor. The section 21 is provided with brackets 24, by means of which the transmission is mounted on a supporting frame, and with top and end access covers 25 and 26 which are bolted in place. A driven shaft 27 projects through the cover 26, and it may be connected to the mechanism to be operated, such as an automobile propeller shaft, machine tool, or the like. Within the casings are the components by means of which the shafts 23 and 27 are interconnected. The relationships among them, whereby the speed ratios of the shafts are determined, are controlled by operation of a governing handle 28 which extends upwardly through the casing section 22.

Figure 4:
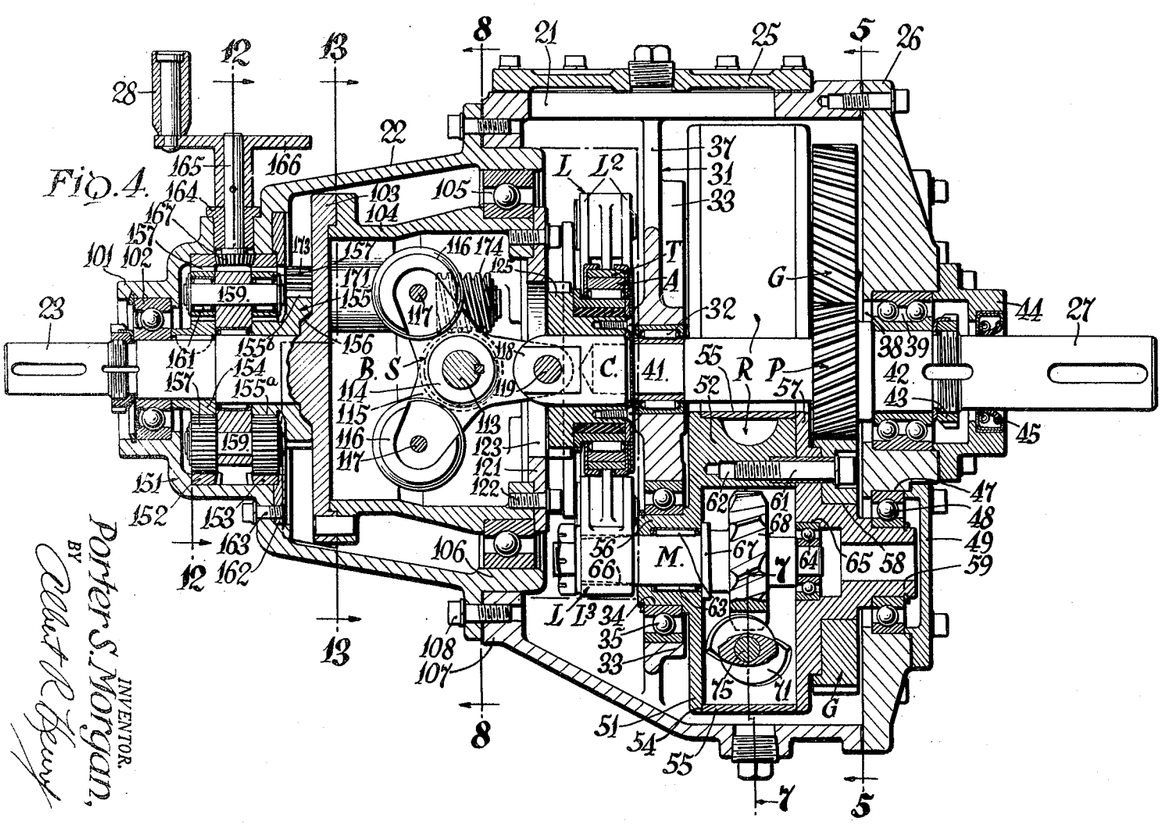
Fig. 4 is a longitudinal section through the transmission, drawn on an enlarged scale.

It may facilitate an understanding of the mechanism to consider some of its components in a general way, reference primarily being made to Fig. 4. Within the conical casing 22 is a rotatably mounted bell-like member B which is directly connected to the driving shaft 23 for rotation in unison therewith. A spider S is mounted within the bell for rotation in unison therewith about the axis of the shaft 23, and also for independent rotation about an axis normal to that of the driving shaft and bell. One arm of the spider S is pivotally connected to a crank pin C, and therefore the crank pin will rotate in, or around, the axis of the shaft 23. The mechanism shown to the left of the bell B, which is operable through the handle 28, constitutes means for imparting the independent rotation to the spider S, to have the effect of changing the radial distance between the axes of the shaft 23 and the crank pin C. The crank pin is therefore one whose arm, or displacement from center, may be varied.

The crank pin C has a guided annular ring A rotatably and concentrically mounted upon it, and, when the pin is displaced from the neutral axis, rotation of the pin in its circular orbit about the axis of the shaft 23 will impart a like orbital motion to the ring A, thus causing the ring to have an eccentric motion. The ring is operatively connected to three shoes T (see also Fig. 8), uniformly spaced around the periphery of the ring, and the shoes are pivotally connected to links or rocker arms L, which in turn are secured at their opposite ends to main shafts M of three ratchet mechanisms R. Upon operation of the transmission, the eccentricity imparted to the ring A therefore causes the shoes T and links L to oscillate about the axes of the shafts M, through angles depending upon the extent to which the crank pin C is displaced from center.

The ratchet units R are so constructed that, when their shafts M are rotated in one direction by the motion of the links L, such shafts may have free rotation with respect to the units R in their entirety. On the other hand, when the links L are swung in the opposite direction, the shafts M become locked to the other elements of the units R, and thereupon such units must rotate in unison with the motion of the links L. The units R are mounted for rotation about the axes of their shafts M, and each unit includes a gear G, in mesh with a pinion P keyed to the output shaft 27. When the ratchet units are in their locked condition, then their bodily rotative motion imparts motion to the pinion P, thereby rotating the driven shaft 27.

Each ratchet member R goes through a complete cycle of free and locked motion during each revolution of the driving shaft 23. The angle through which each unit R turns on its own axis, and therefore the extent to which it advances the driven shaft 27, depends upon the arc through which the links L are swung by the eccentric A. It will thus be understood that, as the crank pin C is moved further away from the axis of the shaft 23, the turning effort in terms of angle per revolution of the driving shaft, is proportionately increased. This is the same as saying that the velocity of the output shaft is increased with respect to the velocity of the input shaft. Inasmuch as the velocity ratio may be made whatever one will, within the range of the apparatus, the invention provides a variable speed and torque proportioning power transmission.

Considering the transmission in greater detail, the casing section 21 is transversely divided by a web 31 which is centrally bored to receive a needle bearing 32. The web is also formed with pads 33 (see also Fig. 5), arranged equiangularly, which are bored to provide apertures 34 for ball bearings 35. The web 31 may also be provided with radial reinforcing ribs 36 and with a cut-away section 37, the latter serving to reduce the weight of the casting. The cover plate 26, which extends over the entire output end of the casing 21, is also centrally bored to provide a shouldered bearing aperture 38 in which is mounted a ball bearing 39. The output shaft 27 has a shouldered inner end 41 rotatably supported by the bearing 32 in the web 31, and a journal 42 which carries the inner race of the bearing 39, thereby providing for the shaft mounting. The bearing 39 is secured by a lock nut 43, and the bore 38 is closed by a retainer housing 44 which is equipped with a shaft seal 45.

The plate 26 is additionally formed with equiangularly spaced bores 47 for bearings 48 which are axially aligned with the bearings 35, to provide mountings for rotatably supporting the three ratchet units R. The bores are externally covered by retainer caps 49, bolted to the main cover 26. The construction of the units R is illustrated in the lower portion of Fig. 5 and in Fig. 6, as well as in Fig. 4.

Each unit R includes a housing provided by a circular plate 51 from which project three circumferentially spaced arcuate bosses 52 whose adjacent ends are cut parallel to each other to provide clearance gaps 53. The maximum radius of each boss 52 is slightly less than that of the plate 51, to provide an annular shoulder 54 for a cylindrical band 55, by means of which the periphery of the housing is closed. The plate 51 is centrally formed with a projecting hollow trunnion 56 whose journal surface is mounted in the inner race of the bearing 35. The opposite end of the housing is closed by a circular cover plate 57, formed with an outwardly projecting annular shoulder 58 to receive the gear G, and an additional hub or trunnion member 59 which is journaled in the bearing 48. The gear and cover plate 57 are secured to the bosses 52 by means of screws 61 extending into tapped apertures 62.

The ratchet units R are thus mounted for rotation about their own axes within the casing 21, with their gears G in mesh with the pinion P on the output shaft 27. Enforced rotation of any one of the units R will thereby cause rotation of the shaft 27, at increased relative speed determined by the ratio between the gears and the pinion.

The ratchet unit main shafts M are rotatably mounted within the housings by needle bearings 63 contained within the hollow trunnions 56, and ball bearings 64 mounted in a shouldered bore 65 centrally formed in the cover plate 57. Each shaft is formed with a splined outer end 66 for connection to a link L, with a thrust collar 67 adapted to abut the inner face of the plate 51, and with a worm wheel 68 which rotates within the inner arcuate surfaces of the bosses 52.

Figures 5, 6, 7:
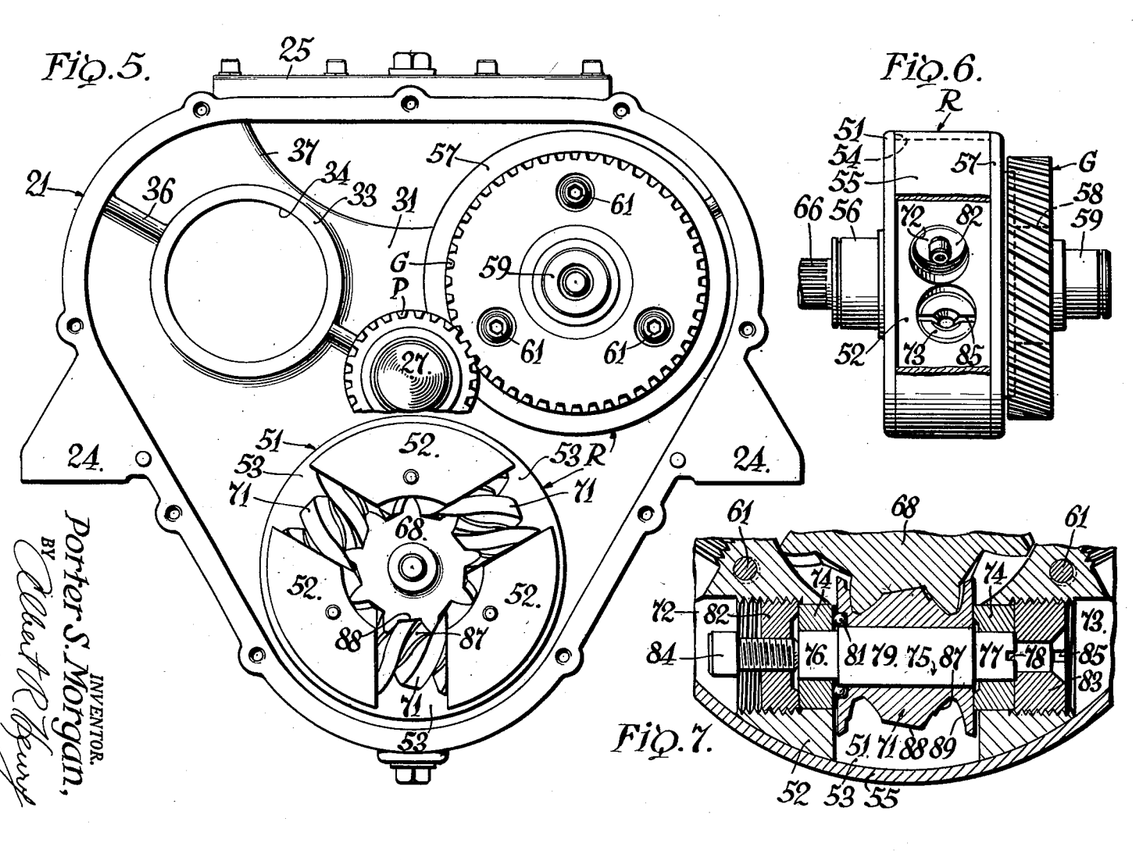
Fig. 5 is a section taken substantially on the line 5—5 of Fig. 4, showing particularly ratcheting mechanisms and the mounting and gearing means associated therewith.
Fig. 6 is a side elevation of a ratchet assembly, with a portion of the circumferential casing broken away.
Fig. 7 is a fragmentary section on the line 7—7, drawn on an enlarged scale, and further illustrating the structure of the ratchet gearing.

The worm wheel 68 is in mesh with three worms 71, each of which is rotatably mounted between the adjacent parallel end surfaces of the bosses 52, in a manner best shown in Fig. 7. The bosses are transversely drilled and are partially tapped to provide pairs of aligned bores 72 and 73, at the inner ends of which are fitted bearing bushings 74. These provide a mounting for a worm axle 75 having concentric end sections 76 and 77—the latter of which is provided with a screw driver slot 78—and a worm supporting intermediate cylindrical journal 79 which is slightly eccentric to the end sections. The worm 71 is rotatably mounted on the portion 79—its bore having running clearance with respect to the journal, while the bushings 74 are press fitted over the end sections 76 and 77, and have a medium to snug fit in the bores 72 and 73.

The worm is recessed on one end to provide a raceway for thrust ball bearings 81 which also engage the face of one of the bushings 74. The bushings are retained in position by nuts 82 and 83, respectively threaded into the tapped portions of the bores 72 and 73. The nut 82 is tapped to receive a screw 84 which abuts the end of the shaft section 76, and the nut 83 is axially drilled to expose the slotted end 78 of the shaft section 77. The nuts 82 and 83 may be provided with screw driver slots 85 to facilitate assembly.

This mounting provides for adjustment between the center to center distance of the worm and wheel, and also for the lateral position of the worm with respect to the wheel periphery. Upon inserting a screw driver in the slot 78, the shaft 75 may be rotated in unison with the bushings 74, which fit in the bores 82 and 83 with sufficient clearance to turn under the applied pressure. The rotative motion shifts the axis of the journal section 79 slightly with respect to the wheel center, thus changing the clearance between the wheel teeth tops and bottoms and the lands of the worm. The nuts 82 and 83 may obviously be moved axially, and the screw 84 may be turned to shift the bushings 74 and worm 71, thereby effecting fine adjustments of the clearances and other relationships between the wheel teeth flanks and worm thread faces.

Referring again to Fig. 6, it will be seen that the bores 72 and 73 of adjacent bosses 52 are slightly misaligned with respect to each other. That is to say, the axes of pairs of aligned bores are, for example, respectively in, and to the right and left, of the median plane through the wheel 68. This arrangement serves to distribute more definitely the contacts between worm threads and wheel teeth over their entire available working surfaces, and eliminates one possible cause of localized wear.

It now becomes in order to examine into the relationships between the wheel teeth and worm threads, which are such as to establish a "reversible-irreversible," or "unidirectional" driving effect, that I have heretofore presented in my prior Patents No. 2,022,141 of November 26, 1935, and No. 2,448,187 of August 31, 1948. The reader is invited to peruse these patents for a detailed discussion, as it will suffice here to tender a condensed statement of the principle involved.

Conventional worm and wheel gearing, in which the worm thread has a low helix angle, is commonly termed "irreversible," because while the worm may be made to rotate in either direction and impart rotation to the wheel, the wheel cannot be power driven to rotate the worm. If, however, the helix angle is increased, the frictional binding force may be so diminished that rotation of the wheel will impart rotation to the worm, thus making the gearing reversible. According to my prior patents, worm and wheel pairs are disclosed, wherein the wheel will drive the worm when rotated in one direction, but not the other. The worm and wheel gearing utilized in the instant invention is advantageously of this selectively reversible or unidirectional type.

As is fully described in my more recently issued patent noted above, each worm 71 is a double thread worm having a high helix angle portion 87 adjacent the root, which will be contacted by the addendum portions of the wheel teeth when the wheel is rotated in a clockwise direction, as viewed in Figs. 5 and 7. Inasmuch as the gearing is "reversible" when a high helix angle is employed, enforced clockwise rotation of the wheel will therefore rotate the worm 71 on its own axis. The tooth bottom spaces and thread lands 88 are so formed that, when the attempt is made to drive the wheel in the opposite, or counter-clockwise direction, these surfaces contact each other with a wedging or braking action, thereby locking the worms and wheel together. This contact is insured by providing suitable clearance on the portion of the worm thread above the high helix angle, and on the opposite thread face 89. When the wheel and worm are jammed, rotation therebetween cannot occur, and the turning moment applied to the shaft M accordingly causes the ratchet unit R to rotate bodily on its own axis.

Figure 8:
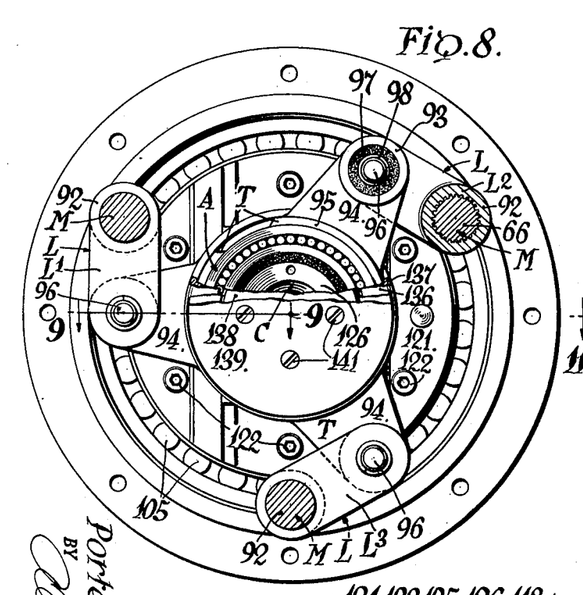
Fig. 8 is a section taken substantially on the line 8—8 of Fig. 4, showing paticularly the operating links and eccentric for driving the ratchet mechanisms.
Figure 9:
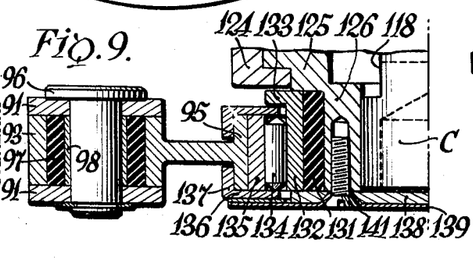
Fig. 9 is a fragmentary section, on an enlarged scale, on the line 9—9 of Fig. 8.
Figure 10:
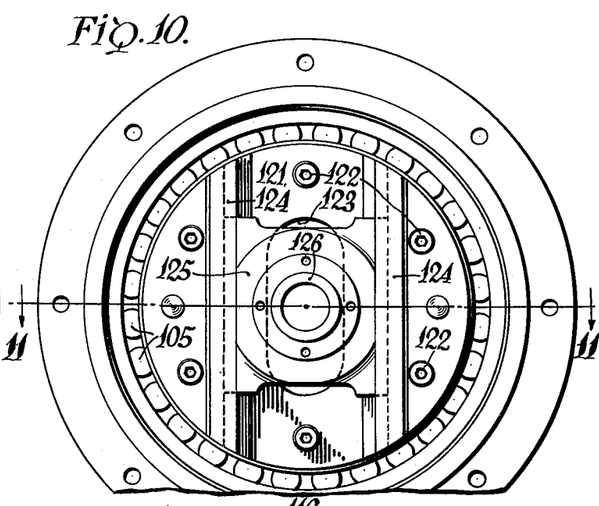
Fig. 10 is a view similar to Fig. 8, with the links and eccentric removed, the better to show means for changing the displacement of the eccentric.

Referring again to Fig. 4, and also to Figs. 8 and 9, the links L, which are attached to the splined ends 66 of the ratchet units R, are in the form of clevises having pierced side plates 91 depending from internally splined hubs 92. The shoes T are formed with a bored hub 93 from which extends a triangular web 94 terminating in an arcuate foot 95. The links and shoes are interconnected by pins 96, passing through the ends of the link side plates, and also the hubs of the shoes, which are internally fitted with resilient bushings 97 and bearing bushings 98. The links and shoes may therefore have pivotal motion with respect to each other, about the axes of the pins 96.

Motion is imparted to the shoes and links through the following mechanism. The casing section 22 is formed at its small end with a housing 101 for a bearing 102, in which is journaled the driving shaft 23. The inner end of the shaft is welded to a circular flange 103, to which in turn is connected a casting 104 forming a part of the driving bell B. The inner periphery of casting 104 is finished to provide a seat for a ball bearing 105 whose outer race is supported on an annular pad 106 on the interior of the housing 22. The outer surface of the housing 22 rests on an annular flange 107 formed in the end of the housing 21, and the two housings are secured to each other by bolts 108.

Figure 11:
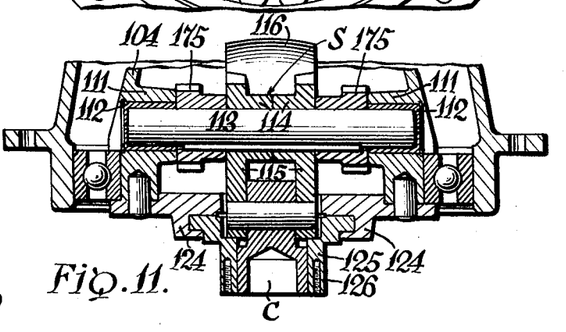
Fig. 11 is a fragmentary section on the line 11—11 of Fig. 10.

The casting 104 is formed with two diametrically opposed internal and transverse bosses 111 (Figs. 11 and 13), into which are fitted end bushings 112 for a counterweight shaft 113 which carries the spider S. The spider consists of two like pieces, each comprising a hub 114 encircling the shaft 113, and three equiangularly spaced radiating arms 115. The pieces are placed hub to hub on the shaft, and counterweights 116 are mounted by means of pins 117 between the two pairs of arms shown in Fig. 4 as projecting toward the input end of the transmission. The third pair, shown as extending along the axis of the shaft 23, engage flat surfaces 118 formed on one end of the crank pin C, which is pivotally mounted to the spider by a pin 119.

The inner end of the casting 104 is covered by a circular plate 121, retained in position by screws 122, and formed with an elongated centrally located aperture 123 through which the crank pin C projects. The outer surface of the plate 121 is also provided with spaced guideways 124 which retain for sliding motion a block 125, formed with a projecting cylindrical hub 126 which surrounds the crank pin C. When the shaft 113 is rotated, the crank pin C and block 125 will thereupon be moved to bring the axis of the pin and hub 126 either closer to, or farther away from, the axis of the shaft 23—depending upon the direction of rotation. The provision of the slide block 125 and guideways 124 assures that the axis of the crank pin will remain parallel to the axis of the shaft 23.

The hub 126 is encircled by a vibration damping ring 131 of resilient material, upon which is mounted an inner race ring 132 formed with an annular retainer flange 133 on its inner end. The ring 132 supports roller bearings 134, interposed between the inner race and an outer race ring 135 which is in engagement with the feet 95 of the shoes T. The shoes are retained against the outer ring by two retainer rings 136 having flanges 137 engaging the outer surfaces of the feet 95. The assembly is maintained by means of a spacer plate 138 and a retainer disc 139 secured in position by screws 141 which enter the hub 126.

The crank pin C is shown in the various views as being in a dead center position—that is, with its axis coinciding with the axis of the shaft 23. The elements surrounding the pin, heretofore generally termed the eccentric A, are therefore concentrically disposed with respect to the same axis. Upon rotation of the shaft 23 under this condition, the eccentric A simply rotates without imparting oscillatory motion to the shoes T, and no power is transmitted to the output shaft 27.

Upon rotation of the counterweight shaft 113 (by means hereinafter to be described), the spider S is correspondingly rotated, thus causing pivotal motion with respect to the pin C about the pivot 119, a slight retractive movement of the pin in the bore of the hub 126, and linear motion of the crank pin and the slide block 125 in the relatively fixed guideways 124. This has the effect of displacing the pin C, and the parts connected thereto, radially from the axis of the shaft 23. The radial distance therefore becomes a crank arm, and the ring assembly A assumes the position of an eccentric.

Under this condition, rotation of the shaft 23 and bell B causes the ring assembly A, including the outer race ring 135, to have an orbital motion, resulting in oscillatory motion of the shoes T and links L. Referring to Fig. 8, one may adopt the usual conventions of assuming counterclockwise rotation of the input shaft, and designating the right hand side of the horizontal diameter as zero degrees or the starting point of a cycle of revolution. At this position, the eccentric will be displaced its maximum distance to the right, and the left hand link L-1 will be swung its maximum distance to the right also. As the shaft 23 turns through a half revolution, the eccentric will then progressively swing the link L-1 to the left, or impart clockwise rotation to it and the ratchet shaft M, and the maximum displacement to the left will occur at 180°. During the next half revolution, the motion of the link L-1, and therefore the rotation of the shaft M connected thereto, will be reversed.

The two links L-2 and L-3 will undergo the same cycle, but will transpose from clockwise to counterclockwise rotation at different degree points in the reference circle. As these links are angularly spaced 120°, the upper right link L-2 will have clockwise movement for the first 60° of shaft rotation, thus acting in the same direction as link L-1, and will then reverse its direction. Link L-3 will, during the first 120° of shaft rotation, move in a counterclockwise direction, and will then reverse to have clockwise rotation, or to move in the same direction as link L-1 for the ensuing 60°. Thus, there is always at least one of the links moving in a clockwise, and in a counterclockwise direction, during each increment of input shaft rotation.

Referring again to Figs. 5 and 7, it will be recalled that clockwise rotation of the shafts M and worm wheels 68, which occurs when their links L have clockwise rotation, corresponds to a condition for a reversible effect between the wheels and worms 71. Accordingly, links L-1 and L-2 will cause their wheels to rotate their worms on their own axes for the first 180° and 60° respectively. For the first 120°, link L-3 is endeavoring to rotate its shaft and wheel in the counterclockwise, or locking direction. Accordingly, during this particular interval in the cycle, the lower ratchet unit R, shown in Fig. 5, is revolving in a counterclockwise direction on its own axis. This motion, as previously noted, effects like rotation of its associated gear G, and therefore clockwise rotation of the pinion P and driven shaft 27.

After 60° of input shaft rotation, link L-2 has counterclockwise motion, and therefore its associated ratchet unit will continue to rotate the pinion P and the driven shaft in the same direction. It will be noted that the oscillatory motion of the links is, at the terminal portion of their arcs, substantially pure harmonic. Hence, the transition from clockwise to counterclockwise motion is smooth and regular, inasmuch as the velocity of the links gradually decreases to zero at the ends of the stroke.

It is of interest to consider the effect of opposite rotations of the main shafts M of adjacent ratchet units. Inasmuch as all three units are directly geared to the pinion P, the clockwise rotation imparted thereto by the counterclockwise driving actions of the ratchet units necessitates a counterclockwise rotation of all ratchet units at all times, whether their shafts M are locked, or are also freely rotating in a clockwise direction. Referring primarily to Fig. 7, it will be readily seen that a counterclockwise rotation of the ratchet housing will carry the worms in planetary fashion around the axis of the wheel. If the wheel, at some given instant, is assumed to be freely rotating in a clockwise direction, the result of the opposite motions is to press the high angle thread 87 even more closely against the wheel teeth, thereby enhancing the freedom of rotation of the forms 71 on their own axes.

Attention may now be directed to Figs. 4 and 11 through 14 for an explanation of the controlling mechanism whereby the displacement of the eccentric A may be varied while the transmission is in operation. Heretofore, great difficulty has been encountered in devising a control system for changing the length of a rotating crank arm, particularly in mechanisms operating at high speeds or carrying heavy loads. A mass rotating about a fixed axis as a center develops centrifugal force, or a tendency to fly off the orbit at a tangent, and this force increases in proportion to the mass and the square of its velocity. While releasing mechanism may be provided to yield to the force—that is, permit its displacement from center to increase—a different problem is presented when the revolving weight must be pulled in toward the center.

In the present invention, it has been noted that the spider S has three arms, two of which carry equipoised counterweights 116 on arms of equal length. In the neutral position shown in Fig. 4, these weights revolve about the axis of the shaft 23 as though they were opposed segments of a flywheel, while the crank pin C revolves on the axis of the shaft. The system is therefore in a state of static and dynamic balance, and rotation may occur with little or no vibration.

The three spider arms are equiangularly spaced, and therefore, in the neutral position, they are displaced from the neutral axis by an amount equal to ($R \cos \theta$), where R is the distance between the centers of shaft 113 and pins 117, and the angle $\theta$ is of course thirty degrees. It can be shown by trigonometric analysis that if the counterweights are equal to each other, and to the mass of the slide 125 and its associated parts, then rotation of the counterweight shaft in either direction does not materially affect the distribution of the masses in relation to their centrifugal and centripetal effects. In other words, if a clockwise rotation be assumed through some angle, there will be an addition to the force exerted by one weight, a diminution of the force of the other counterweight, and an increase of the force of the central mass, but the resultant of these forces is zero, irrespective of the angle of rotation. Upon reverse or counterclockwise rotation, there are diminutions in the forces exerted by the slide and upper counterweight, but an increase in the force developed by the lower weight, and the resultant again is zero. Under these conditions, the force exerted by the movable slide and associated parts is internally and inherently balanced, and the effort required to move it, even though in motion at high speed, becomes insignificant.

Figures 12, 13, 14:
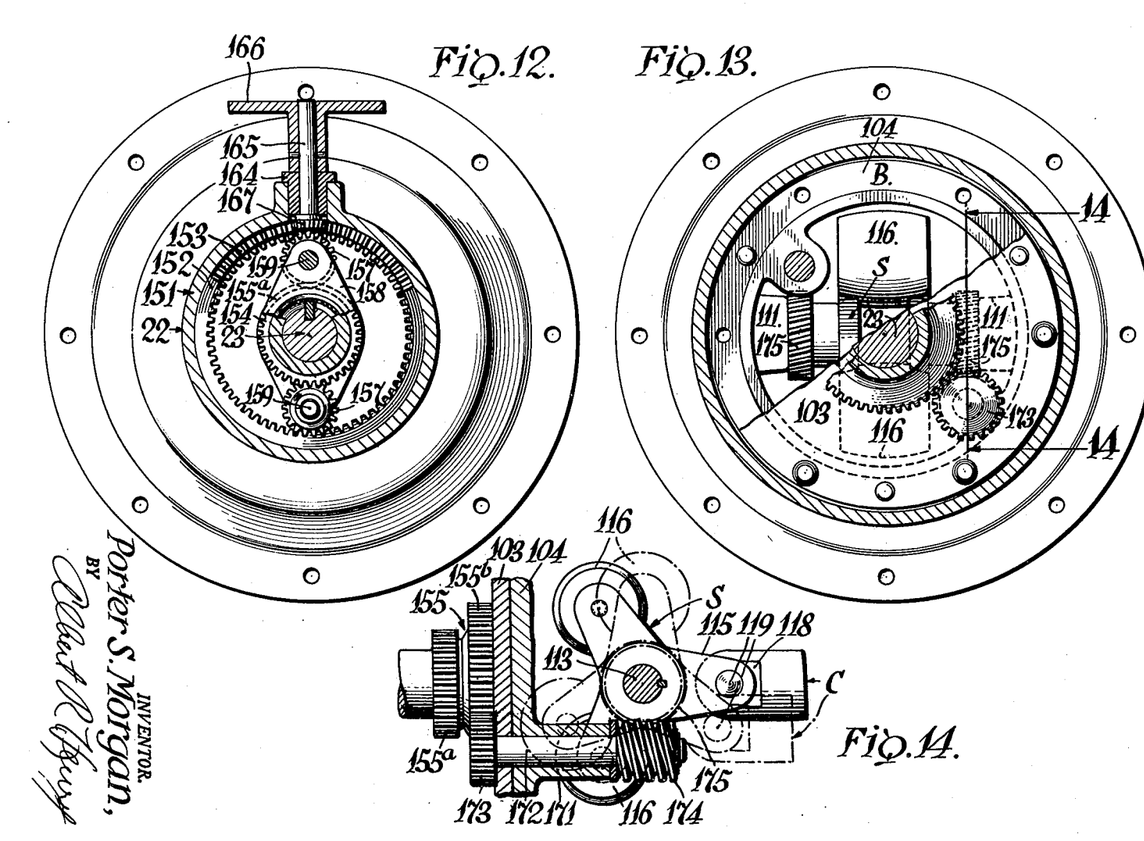
Figs. 12 and 13 are sections respectively taken substantially on the lines 12—12 and 13—13 of Fig. 4, particularly illustrating governing mechanism for varying the eccentric displacement.
Fig. 14 is a fragmentary section taken substantially on the line 14—14 of Fig. 13.

Considering initially Figs. 4 and 12, the casing section 22 is formed with a gear box 151 at its small end. The box contains two ring gears 152 and 153, each formed with internal teeth and with beveled teeth on their facing rims. The shaft 23 has keyed thereto within the box a spur gear 154, and it also carries a cluster gear 155 snugly fitted thereon. The smaller of the cluster gears 155a has the same diameter and number of teeth as the gear 154, and it is located within the box 151 in alignment with the ring gear 153. The larger gear 155b of the cluster pair is disposed outside of the box, and it abuts a shoulder 156 formed on the flange plate 103 of the bell B.

The shaft-carried spur gears 154 and 155a are in mesh with pairs of planet pinions 157, which in turn mesh with the internal teeth of the gears 152 and 153. The pinions are connected in pairs by a gear spider 158 to which is secured diametrically opposed pins 159 for the reception of the planet pinions 157 through interposed needle bearings 161. The gear set is retained in its box by a plate 162, secured by screws 163. The upper part of the box is drilled to receive a bushing 164 through which projects a stem 165, on the outer end of which is a wheel 166 carrying the control handle 28. The inner end of the stem carries a bevel pinion 167 in mesh with the rim teeth of the ring gears 152 and 153.

When the shaft 23 is rotated, the keyed spur gear 154 imparts rotation to the pinions 157, which rotate on their own axes and also travel with the spider 158 in planetary manner within the ring gears 152 and 153. Inasmuch as the ring gears are fixed, being interconnected and locked by the control pinion 167, the motion of the spider 158 imparts motion to the cluster gear 155a. As the pinions 157 are all of the same size, and as the gear 155a matches the gear 154, then the cluster gear will revolve at the same speed as the shaft 23, and the bell B. In other words, there is no rotative motion between the gear 155b and the flange plate 103 under this condition.

If, however, the handle 28 should be turned, thus turning the bevel pinion 167 in one direction or the other, there is an accompanying relative movement in opposite directions between the ring gears 152 and 153. This motion will require, for the compensation of the relative speed changes between the pairs of pinions 157 in mesh with the ring gears, a differential motion between the gears 154 and 155. Accordingly, whenever the handle is operated, the cluster gear 155b revolves at a speed either slightly less or greater than shaft speed, and there is slippage and relative motion between the gear 155b and the bell B.

The body of the bell B is formed with a pair of longitudinally extending bosses 171 adjacent its inner periphery, and these are bored to receive shafts 172 having pinions 173 on the outer ends thereof which mesh with the gear 155b. The inner ends of the shafts 172 are provided with keyed small conventional worms 174, in mesh with worm wheels 175 keyed on the counterweight shaft 113 (compare also Fig. 11). The pinions 173 of course rotate with the bell plate, and, as long as the relationship between the speeds of the bell and the gear 155b are not disturbed, there is no relative motion to impart rotation to the pinions 173.

Under this condition, the counterweight shaft is fixed with respect to its own axis, and the counterweights 116 and crank pin C remain in whatever position of dead center or displacement they have been placed. Upon operation of the control handle 28, and slippage of the gear 155b with respect to the bell B, while the pinion 173 continues its planetary motion at shaft speed, the pinion must compensate by rotation on its own axis. The resulting rotation of the worms 174 therefore causes rotation of the shaft 133, and with it a corresponding variation of the displacement of the eccentric A and the speed ratio between the input and output shafts 23 and 27. As soon as movement of the pinion 167 is discontinued, the cluster gear 155 again rotates at shaft speed or without slippage.

It will now be understood that the present invention provides a variable speed power transmission, wherein rotation of the input shaft enforces rotation of the output shaft at a speed ratio which may be made any value. The changes in the effective length or displacement of the crank or eccentric mechanism varies the amplitude of the ratchet units, and therefore the extent to which the output shaft will be rotated for each complete revolution of the input shaft. Inasmuch as the ratchet mechanisms are successively operated, and their driving movements overlap, there is a continuous rotative force applied to the output shaft to drive it substantially free from velocity fluctuations. The counterbalancing system for the rotating crank pin assembly, and the control means therefor, permit modification of the speed ratio between the input and output shafts while the transmission is in operation.

Although the invention has been described in detail with respect to one embodiment, it will be apparent that numerous modifications may be made in its components without departure from the underlying principles. It will also be understood that many features of the invention may be utilized to advantage without inclusion of other parts. It is accordingly intended that the invention should not be considered as limited to the precise arrangement and form illustrated, but that it should be deemed to encompass all those combinations and parts which may fall within the scope of the following claims.

I claim:
1. A power transmission mechanism comprising a casing, an input shaft extending into and rotatably mounted in the casing, a spider shaft operatively connected to and bodily rotatable with the input shaft, a spider mounted on the spider shaft, said spider having a plurality of arms, a crank pin assembly carried by one of said arms, counterweight members carried by the remaining arms, means extending into the casing and operatively connected to the spider shaft for rotating the same on its own axis, thereby to displace the crank pin assembly radially with respect to the input shaft, an output shaft, means connecting the crank pin assembly to the output shaft to rotate the same as the crank pin assembly is rotated, the sum of the moments of the counterweight members and the crank pin assembly about the axis of bodily rotation of the spider shaft being substantially equal to zero.

2. A power transmission comprising a casing, an input shaft rotatably mounted in the casing, a spider shaft operatively connected to and bodily rotatable with the input shaft, said spider shaft being mounted with its axis normal to the axis of the input shaft, means extending into the casing and connected to the spider shaft to rotate the same on its own axis, a spider mounted on the spider shaft, said spider having equiangularly spaced arms, a crank pin assembly connected to one of said arms, said one arm having an axis adapted to be coincident with or parallel to the axis of bodily rotation of the spider shaft, counterweights on the other arms, the sum of the moments of the counterweights and crank pin assembly about said axis of bodily rotation being substantially equal to zero, power take off mechanism in the casing, and means operatively connecting the crank pin assembly to the take off mechanism.

3. In a power transmission mechanism including a casing and a power input shaft rotatably mounted in the casing, a driving bell connected to the input shaft for rotation about the axis thereof, a spider shaft mounted in the bell for rotation about its own axis and for bodily rotation about the axis of the input shaft, the axis of the spider shaft being normal to the axis of the input shaft, a spider having equiangularly spaced arms mounted on the spider shaft for rotation therewith, one of said arms having an axis parallel to the axis of the input shaft, a crank pin assembly carried by said one arm, counterweights on the other arms of the spider, said counterweights having masses substantially equal to each other and to the mass of the crank pin assembly, power take off mechanism connected to the crank pin assembly to be operated thereby, and means extending into the casing and connected to the spider shaft to rotate the same about its own axis to vary the distance between the axes of the input shaft and crank pin assembly.

4. In a power transmission mechanism including a casing and an input shaft mounted for rotation in the casing, a spider having equiangularly spaced radial arms operatively connected to the input shaft for rotation in unison therewith, one of said arms having an axis adapted to be positioned coincident with or substantially parallel to the axis of the input shaft, a crank assembly mounted on said one arm, counterweights mounted on the remaining arms, the moments of the counterweights and crank assembly about the axis of the input shaft being substantially equal to zero, means extending into the casing and connected to said spider to shift the axis of the crank assembly with respect to the axis of the input shaft, thereby to vary the effective throw of said assembly, and power take off means operatively connected to the crank assembly and adapted to be driven thereby as said input shaft and crank are rotated.

5. In a power transmission including a casing and an input shaft rotatably mounted in the casing, a driving bell rotatably mounted in the casing and connected to the input shaft for rotation in unison therewith, a spider shaft mounted in the bell transversely of the input shaft, a crank pin carried by the spider shaft, a control shaft rotatably mounted in the driving bell for rotation in unison therewith, gearing interconnecting the control shaft and spider shaft, differential gearing having elements respectively connected to the input shaft and control shaft, means interconnecting said elements for synchronous motion as said input shaft, driving bell and control shaft rotate in unison, and means extending into the casing and engaging said elements for imparting asynchronous motion thereto, thereby to rotate the control shaft and shift the position of the crank pin.

6. In a power transmission including a casing and an input shaft rotatably mounted in the casing, a driving bell rotatably mounted in the casing and connected to the input shaft for rotation in unison therewith, a crank member carried by the driving bell and adapted to be shifted with respect thereto, a control shaft rotatably mounted in the driving bell and adapted to be bodily rotated in unison therewith, gearing interconnecting the control shaft and crank member to shift the crank member when the control shaft is rotated on its own axis, a gear box formed in the casing, ring gears mounted in the box around the input shaft, planet pinions in mesh with the ring gears and connected to each other, a spur gear keyed to the input shaft and in mesh with one of said planet pinions, a second spur gear rotatably mounted on said shaft and said driving bell, said second gear having a driving engagement with the control shaft and with the other of said planet pinions, whereby rotation of the input shaft and the gear keyed thereto enforces synchronous rotation of said second gear with the input and control shafts, and means connected to said ring gears to impart relative motion therebetween, thereby to impart asynchronous motion to said second gear and rotation of the control shaft on its own axis.

PORTER S. MORGAN.

REFERENCES CITED

The following references are of record in the file of this patent:

UNITED STATES PATENTS

| Number | Name | Date |
|---|---|---|
| 772,894 | Le Blond | Oct. 18, 1904 |
| 977,449 | Hayden | Dec. 6, 1910 |
| 1,470,565 | Hall | Oct. 9, 1923 |
| 1,901,098 | Guiness | Mar. 14, 1933 |

FOREIGN PATENTS

| Number | Country | Date |
|---|---|---|
| 41,063 | Sweden | Nov. 20, 1913 |
| 158,271 | Germany | June 25, 1929 |
| 576,821 | France | Aug. 27, 1924 |